United States Patent [19]

Newendorp et al.

[11] Patent Number: 4,559,847

[45] Date of Patent: Dec. 24, 1985

[54] STEERING PRESSURE-RESPONSIVE DIFFERENTIAL LOCK CONTROL SYSTEM

[75] Inventors: Bruce C. Newendorp, Cedar Falls; Terry L. Sturtz, Waterloo; Lawrence V. Anderson, Cedar Falls, all of Iowa

[73] Assignee: Deere & Company, Moline, Ill.

[21] Appl. No.: 503,970

[22] Filed: Jun. 13, 1983

[51] Int. Cl.[4] .................. F16H 1/44.5; F16H 1/44
[52] U.S. Cl. .................................... 74/710.5; 74/713
[58] Field of Search ............... 74/710, 710.5, 711, 74/713, 752 A, 752 C, 752 D, 866; 192/4 A

[56] References Cited

U.S. PATENT DOCUMENTS

| | | | |
|---|---|---|---|
| 2,722,134 | 11/1955 | Cabell | 74/472 |
| 2,830,670 | 4/1958 | Ferguson | 74/710.5 X |
| 2,874,790 | 2/1959 | Hennessey | 180/6.2 |
| 2,934,975 | 5/1960 | Algie | 74/650 |
| 3,138,970 | 6/1964 | Costa et al. | 74/711 |
| 3,292,720 | 12/1966 | Harvey | 180/6.2 |
| 3,400,610 | 9/1968 | Taylor et al. | 74/710.5 |
| 3,439,785 | 4/1969 | Hughson | 74/710.5 X |
| 3,446,320 | 5/1969 | Schott | 192/4 |
| 3,463,277 | 8/1969 | Allori et al. | 192/4 |
| 3,467,212 | 9/1969 | Doll | 180/6.2 |
| 3,498,427 | 3/1970 | Bingley | 192/13 |
| 3,640,360 | 2/1972 | Dollase | 192/4 A |
| 3,642,103 | 2/1972 | Schott | 192/4 A |
| 3,732,752 | 5/1973 | Louckes et al. | 74/710.5 |
| 3,788,166 | 1/1974 | Hart et al. | 74/710.5 |
| 3,845,671 | 11/1974 | Sharp et al. | 74/710.5 |
| 3,871,249 | 3/1975 | Jeffers | 74/711 |
| 3,945,475 | 3/1976 | Khatti | 74/710.5 X |
| 4,113,044 | 9/1978 | Williams et al. | 74/710.5 X |
| 4,218,938 | 8/1980 | Hattori | 74/710.5 |
| 4,347,760 | 9/1982 | Jewett | 74/710.5 |

FOREIGN PATENT DOCUMENTS

WO81/02049 7/1981 PCT Int'l Appl. .

Primary Examiner—Leslie A. Braun
Assistant Examiner—Dwight G. Diehl

[57] ABSTRACT

A differential lock control system controls a hydraulically-operated differential lock via a solenoid valve. Energization of the solenoid valve is controlled by a circuit which includes a normally closed latching relay, a normally open relay and a pair of operator-controlled momentary contact switches. The control circuit further includes a pair of steering valve-operated switches coupled in parallel and to the normally closed relay. Each steering-operated switch is formed by a conductive plunger which is grounded by the steering valve housing whenever the steering valve spool is moved to the end of the valve bore to compress a resilient and electrically insulating O-ring interposed between the plunger and the valve spool.

6 Claims, 2 Drawing Figures

STEERING PRESSURE-RESPONSIVE DIFFERENTIAL LOCK CONTROL SYSTEM

BACKGROUND OF THE INVENTION

This invention relates to a control system which controls the locking and unlocking of a differential gear mechanism.

It is well known to provide vehicles, such as farm tractors, with differentials which can be selectively locked or unlocked. In a simple form, differential lock control systems are in use wherein a solenoid-operated differential lock control valve is controlled by a single, manually-operated floor switch. However, with such a system, the vehicle operator must continuously depress the floor switch in order to keep the differential locked. On both row crop and four-wheel drive (4WD) tractors with differential locks, a locked differential can interfere with the steering of the tractor. One solution to this problem, applicable to row crop tractors, has been to unlock the differential in response to a left or right wheel brake application since the brakes are often used to assist the turning of a row crop tractor. Such a system is described in U.S. Pat. No. 2,874,790 (Hennessey).

Another solution to this problem has been to control the locking of the differential as a function of the relative angle between mechanical components of the tractor steering system. An example of this is also shown in the Hennessey patent. Now, it is often necessary to operate a farm tractor in a sidehill situation where the tractor's front end is constantly angled slightly uphill to compensate for the tendency of the tractor to drift in a downhill direction. In such a situation, it would be desirable to have the differential remain locked. However, a steering angle dependent system, such as shown in the Hennessey patent, may automatically unlock the differential in this sidehill situation, regardless of whether such unlocking is desirable or necessary, if the steering angle exceeds the particular angle beyond which the differential is unlocked.

SUMMARY OF THE INVENTION

An object of the present invention is to provide a steering-responsive differential lock control system which does not automatically unlock the differential unless a predetermined steering effort is required.

Another object of the present invention is to provide a steering-responsive differential lock control system with which a vehicle may be operated under sidehill conditions without unlocking the differential.

Another object of the present invention is to provide a steering-responsive differential lock control system, the operation of which is not dependent solely on the angular relationship of the steering components.

These and other objects are achieved by the present invention which includes hydraulically-operated differential locks controlled by a solenoid valve. Energization of the solenoid valve is controlled by a circuit which includes a normally closed latching relay, a normally open relay and a pair of operator-controlled momentary contact switches.

The control circuit further includes a pair of steering valve-operated switched coupled in parallel and to the normally closed relay. Each steering-operated switch is formed by a conductive plunger which is grounded by the steering valve housing whenever the steering valve spool is moved to the end of the valve bore to compress a resilient and electrically insulating O-ring interposed between the plunger and the valve spool.

DETAILED DESCRIPTION

Figure 1:
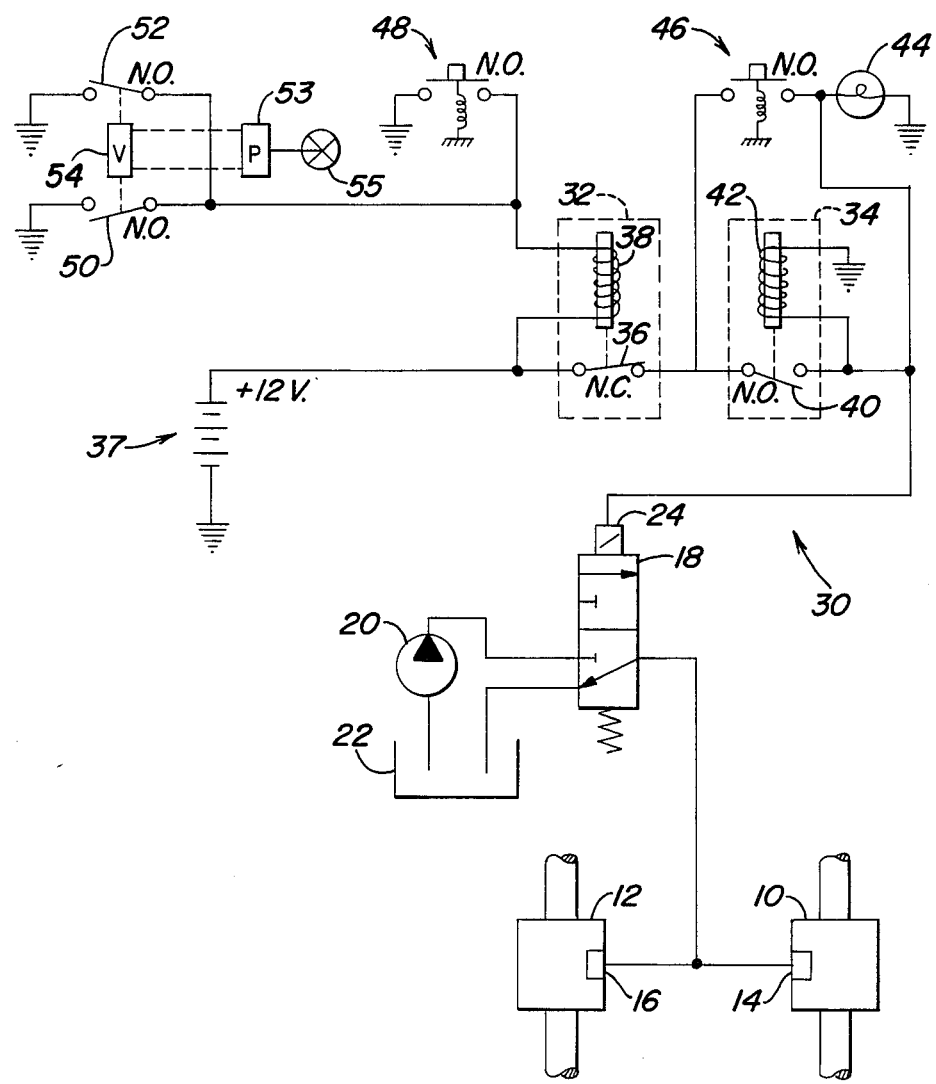
FIG. 1 is a simplified schematic diagram of a differential lock control system according to the present invention.

An articulated four-wheel-drive tractor includes front and rear conventional differentials 10 and 12 which may be locked and unlocked by means of conventional hydraulically-operated differential locks 14 and 16, respectively. The locks 14 and 16 are pressurized and locked or unpressurized and unlocked by means of a 2-way, 2-position conctrol valve 18 which controls fluid communication between the locks 14 and 16 and a pump 20 and a reservoir 22. The valve 18 is controlled by a solenoid 24 which is energized by from a control circuit 30.

The control circuit 30 includes a normally closed relay 32 and a normally open latching relay 34. Relay 32 includes a normally closed switch 36 which is opened when coil 38 is energized. Relay 34 includes a normally open switch 40 which may be latched closed when coil 42 is energized. One side of switch 40 is coupled to solenoid 24, to ground via coil 42 and via indicator light 44, and to one side of normally open momentary contact switch 46. The other side of switch 40 is coupled to one side of switch 36 and to the other side of switch 46. The other side of switch 36 is coupled to a +12 volt potential source (or battery) 37 and to one side of coil 38. The other side of coil 38 is coupled to ground via a second normally open momentary contact switch 48 and via parallel connected switches 50 and 52 which are operatively coupled to a conventional spool-type steering control valve 54. Steering control valve 54 operates in response to a conventional metering pump 53 controlled by a steering wheel 55. Indicator light 44 and switches 46 and 48 are preferably mounted in the vehicle operator's compartment (not shown).

Figure 2:
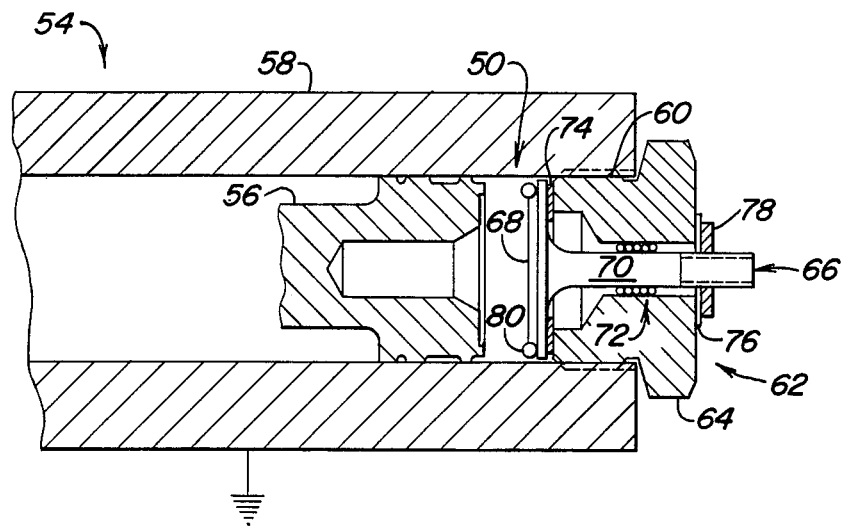
FIG. 2 is a sectional view of the steering-operated switch mechanism of the present invention.

Turning now to FIG. 2, the conventional steering valve 54 is the type which has a spool 56 which moves from side to side within a grounded housing 58, in response to oil displacement from the steering metering pump 53 which is driven by the vehicle steering wheel 55. The housing 58 has a threaded bore 60 at both ends (one of which is seen in FIG. 2). The bore 60 receives a switch module 62 which includes a hollow threaded sleeve 64 which is screwed into the bore 60. A conducting plunger 66 with a flange 68 and a shaft 70 is received within sleeve 64. The plunger 66 is electrically connected to the low voltage side of coil 38. The shaft 70 is resiliently held within sleeve 64 by a plurality of electrically insulating O-rings 72. The plunger 66 is also electrically isolated from sleeve 64 by means of an insulating washer 74 which is placed between the flange 68 and the annular end face of sleeve 64 and by means of an insulating washer 76 which is placed between a retaining nut 78 and the outer end face of sleeve 64. The outer edge of flange 68 is grooved to hold an O-ring 80. When the valve spool 56 is urged towards module 62 with sufficient force, then the O-ring 80 will be compressed to permit contact between plunger 66 and spool 56, thus grounding plunger 66 via the spool 56 and the housing 58. This structure is placed at both ends of the steering valve 54 and thus, comprises the switches 50 and 52 shown schematically in FIG. 1.

MODE OF OPERATION

Assuming that relays 32 and 34 are initially closed and open, respectively, as shown in FIG. 1, then solenoid 24 will be de-energized and the differentials 10 and 12 will be unlocked. To lock the differentials, the operator may momentarily close switch 46. This energizes indicator lamp 44 and solenoid 24 and locks the differentials. It also energizes relay coil 42 and latches relay 34 closed so that coil 24 remains energized via relays 36 and 34 after switch 46 is released and opened.

If, during operation, the tractor cannot be sufficiently articulated due to lack of steering capacity, the torque applied to the steering wheel 55 will ultimately become large enough to cause the pilot pressure in valve 54 to force the spool 56 towards the plunger 66, compressing O-ring 80 until contact is made between spool 56 and the end face of plunger 66. This contact completes a circuit between the low potential side of coil 38 and ground, thus energizing coil 38 and opening relay 32. When relay 32 is opened, the battery 12 is then disconnected from solenoid 24, thus de-energizing solenoid 24 and unlocking the differentials 10 and 12. This also de-energizes relay coil 42 and opens relay 34 so that when the steering effort is reduced and switch 50 or 52 reopens to reclose relay 32, the relay 34 remains open so that the differentials remain unlocked. Alternatively, the differentials can be manually unlocked by momentarily closing switch 48, which acts upon relays 32 and 34 in the same manner as switches 50 and 52. Once relay 34 is opened, then the diffferential can be relocked by closing switch 46, as previously described.

While the invention has been described in conjuction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. In a vehicle having an hydraulic steering system including a steering valve, axle shafts driven through a differential and locking means for locking and unlocking the differential, a differential lock control system comprising:
    operator-controlled switch means coupled to the locking means for causing the locking means to lock and unlock the differential in response to operator-actuation thereof; and
    steering-responsive switch means connected to the locking means and to the steering valve for responding to a predetermined fluid pressure in the steering valve to cause the locking means to unlock the differential when it is locked, the steering valve comprising a conductive housing connected to a ground potential having a bore therein and a conductive valve spool movable in the bore, and the steering-responsive switch means comprising a conductive plunger mounted in an end of the valve housing, insulating means for electrically isolating the plunger from the housing, means for electrically coupling the plunger to the locking means, the plunger having an end face engageable with the valve spool to complete a circuit between the locking means and the ground potential thereby unlocking the differential.

2. The control system of claim 1, wherein the steering-responsive switch means further comprises:
    a resilient insulating member mounted between the spool and plunger for preventing engagement between the spool and plunger unless the spool moves to deform the resilient member by a predetermined amount.

3. The control system of claim 1, wherein the steering-responsive means comprises indentical and parallel connected switch means mounted at opposite ends of the steering valve.

4. In a vehicle having a hydraulic steering system including a steering valve, axle shafts driven through a differential and locking means for locking and unlocking the differential, a differential lock control system comprising:
    operator-controlled switch means coupled to the locking means for causing the locking means to lock and unlock the differential in resonse to operator-actuation thereof;
    steering-responsive switch means connected to the locking means and to the steering valve for responding to a predetermined fluid pressure in the steering valve to cause the locking means to unlock the differential when it is locked;
    a normally open (N.O.) latching relay coupled to the locking means; and
    a normally closed (N.C.) relay coupled between the (N.O.) relay and the steering-responsive switch means.

5. The control system of claim 4, wherein:
    the relays have coil-operated relay switches coupled in series between a potential source and the locking means, the N.O. relay switch having one side coupled to the locking means, to a ground potential and to a first relay coil, the N.C. relay switch having one side coupled to the other side of the N.O. relay switch, the other side of the N.C. relay switch being coupled to the potential source and to the ground via a second relay coil and via the steering-operated switch means; and
    the operator-controlled switch means comprising a first normally open momentary contact switch coupled between the second relay coil and ground potential, and a second normally open momentary contact switch coupled in parallel with the N.O. relay switch.

6. The control system of claim 4, wherein:
    the relays have coil-operated switches coupled in series between a potential source and the locking means, the N.O. relay switch having one side coupled to the locking means, to a ground potential and to a first relay coil, the N.C. relay switch having one side coupled to the other side of the N.O. relay switch, the other side of the N.C. relay switch being coupled to the potential source and to ground via a second relay coil and via the steering-operated switch means;
    the operator-controlled switch means comprises a first normally open momentary contact switch coupled between the second relay coil and ground potential, and a second normally open momentary contact switch coupled in parallel with the N.O. relay switch;
    the steering valve comprises a conductive housing connected to ground potential having a bore therein and a conductive valve spool movable in the bore; and the steering-responsive switch means comprises a conductive plunger monted in an end of the valve housing, insulating means for electrically isolating the plunger from the housing, means for electrically coupling the plunger to the second relay coil, the plunger having an end face engageable with the valve spool to complete a circuit between the second relay coil and the ground potential thereby unlocking the differential.

* * * * *

UNITED STATES PATENT AND TRADEMARK OFFICE
CERTIFICATE OF CORRECTION

PATENT NO. : 4,559,847
DATED : 24 December 1985
INVENTOR(S) : Bruce Craig Newendorp et al It is certified that error appears in the above-identified patent and that said Letters Patent is hereby corrected as shown below:

```
Col. 4, line 11, delete "indentical" and insert -- identical --.
Col. 4, line 21, delete "resonse" and insert -- response --
Col. 4, line 41, delete "the" (second occurrence).
Col. 5, line 4, delete "monted" and insert -- mounted --.
```

Signed and Sealed this

Fifteenth Day of July 1986

[SEAL]

Attest:

Attesting Officer

DONALD J. QUIGG

Commissioner of Patents and Trademarks